United States Patent
Yamamoto

(10) Patent No.: US 10,855,212 B2
(45) Date of Patent: Dec. 1, 2020

(54) METHOD FOR DETECTING MAGNETIC FIELD LOCATION IN ELECTRIC MOTOR

(71) Applicant: HOKUTO CONTROL Co., Ltd., Nagano (JP)

(72) Inventor: Kiyoshi Yamamoto, Nagano (JP)

(73) Assignee: HOKUTO CONTROL CO., LTD., Nagano (JP)

( * ) Notice: Subject to any disclaimer, the term of this patent is extended or adjusted under 35 U.S.C. 154(b) by 0 days.

(21) Appl. No.: 16/496,290

(22) PCT Filed: Mar. 28, 2018

(86) PCT No.: PCT/JP2018/012759
§ 371 (c)(1),
(2) Date: Sep. 20, 2019

(87) PCT Pub. No.: WO2019/008846
PCT Pub. Date: Jan. 10, 2019

(65) Prior Publication Data

US 2020/0136536 A1    Apr. 30, 2020

(30) Foreign Application Priority Data

Jul. 6, 2017 (JP) ................................. 2017-132943
Oct. 4, 2017 (JP) ................................. 2017-194189

(51) Int. Cl.
*H02P 6/16* (2016.01)
*H02P 6/15* (2016.01)

(52) U.S. Cl.
CPC .................................. *H02P 6/153* (2016.02)

(58) Field of Classification Search
CPC .. H02P 27/08; H02P 6/16; H02P 6/153; H02P 6/20; H02P 6/18; H02P 6/24; H02P 23/009; H02P 21/18
See application file for complete search history.

(56) References Cited

U.S. PATENT DOCUMENTS

| 5,903,129 A * | 5/1999 | Okuno ................... H02P 21/18 |
| | | 318/721 |
| 2007/0216325 A1* | 9/2007 | Fukamizu ............... H02P 6/182 |
| | | 318/400.34 |

(Continued)

FOREIGN PATENT DOCUMENTS

| JP | H10174482 | 6/1998 |
| JP | 2006-254626 | 9/2006 |
| JP | 2017-022867 | 1/2017 |

OTHER PUBLICATIONS

International Search Report for PCT/JP2018/012759, dated Jul. 17, 2018. Written Opinion of the International Searching Authority for PCT/JP2018/012759, dated Jul. 17, 2018.

(Continued)

*Primary Examiner* — Thai T Dinh
(74) *Attorney, Agent, or Firm* — Stephen J. Weyer, Esq.; Stites & Harbison, PLLC

(57) ABSTRACT

The present invention addresses the problem of providing a method for detecting magnetic field location which can realize low cost by using simple hardware and software and can detect a rotor location in units of excitation sections in 120°-energization without generating sensing noise at the time of initiation. As a solution, an MPU (51) obtains, through calculation, a neutral point potential from an energization-phase voltage measured by an A/D conversion circuit (53), obtains the difference between the neutral point potential and a non-energization-phase voltage, performs magnitude comparison between the difference and a negative-side threshold value in the case where the present location is an odd-numbered section or between the difference and a positive-side threshold value in the case where the present location is an even-numbered section, and determines the end point of the 60°-energization section when the (Continued)

difference exceeds a threshold value in a direction away from the neutral point potential.

8 Claims, 10 Drawing Sheets

(56) References Cited

U.S. PATENT DOCUMENTS

| | | | |
|---|---|---|---|
| 2009/0200971 A1 | 8/2009 | Iwaji et al. | |
| 2011/0234133 A1 | 9/2011 | Hano et al. | |
| 2012/0181963 A1* | 7/2012 | Wang ........................ | H02P 6/22 318/400.33 |
| 2013/0057193 A1* | 3/2013 | Iwaji ....................... | H02P 6/185 318/721 |
| 2014/0217936 A1* | 8/2014 | Okamoto ............ | H02P 29/0241 318/400.13 |

OTHER PUBLICATIONS

Supplementary European Search Report dated May 12, 2020 in European Application No. 18828520.9.

* cited by examiner

METHOD FOR DETECTING MAGNETIC FIELD LOCATION IN ELECTRIC MOTOR

TECHNICAL FIELD

The present invention relates to a method for detecting a magnetic field location in an electric motor, e.g., brushless DC motor, in a stationary state and in a state of rotating at a low speed.

BACKGROUND ART

Conventionally, motors having brushes have been used as small DC motors, but they have problems of brush noise, electric noise, low durability, etc., so brushless motors have been developed to solve the problems. These days, sensorless motors, which have no location sensors, draw attention as compact, light, tough and low-cost motors, and they were firstly employed in information technology devices, e.g., hard disk drive unit, and then employed in home electric appliances, car-mounted devices, etc. due to progression of vector control technology.

A three-phase brushless direct current (DC) motor is shown in FIG. 9 as an example of a sensorless motor having no location sensor. A rotor 2 is capable of rotating about a rotor shaft 1 and has a permanent magnet 3 having a pair of magnetic poles, i.e., S-pole and N-pole. A type of magnetic pole structure (IPM, SPM) and a number of magnetic poles may be optionally selected. In a stator 4, armature coils (coils) U, V and W are formed on pole teeth, which are provided with a phase difference of 120°, and they are star-connected through a common point C.

An example of a block diagram of a conventional sensorless drive circuit is shown in FIG. 10. MOTOR is a three-phase sensorless motor. An MPU 51 is a microcontroller (control means). The MPU 51 stores six energization patterns for three-phase coils (U, V, W) and field location information corresponding to each of the energization patterns, and switching-controls output means (INV 52), on the basis of a rotation command RUN from a superordinate controller 50, so as to optionally switch an excitation state. The INV 52 is an inverter circuit (output means) having a three-phase half bridge structure. ZERO acts as a zero-cross comparator and a dummy common producing part. Note that, the actual circuit further includes an electric source, a host interface part, etc., but the are omitted for easy explanation.

A timing chart of a typical example of 120° energization for driving the three-phase brushless motor is shown in FIG. 11. In a section 1, rectangular-wave energization is performed from the U-phase to the V-phase; in a section 2, rectangular-wave energization is performed from the U-phase to the W-phase; in a section 3, rectangular-wave energization is performed from the V-phase to the W-phase; in a section 4, rectangular-wave energization is performed from the V-phase to the U-phase; in a section 5, rectangular-wave energization is performed from the W-phase to the U-phase; and in a section 6, rectangular-wave energization is performed from the W-phase to the V-phase. Dotted lines are waveforms of induced voltages. HU to HW are waveforms of outputs of hall sensors provided in the motor, and excitation-switching in the conventional brushless DC motor having the position sensor is performed on the basis of signals of the sensors.

In the sensorless driving manner, locations of the rotor are detected on the basis of the induced voltages, but the rotor cannot be started when a speed is zero because no voltages are induced in a stationary state and the location of the rotor cannot be detected. To detect a location of the rotor in a stationary state, a manner, in which the coil current sensor and the current detecting circuit are provided and the location of the rotor is estimated by current response caused by passing sine-wave coil currents through the coils by PWM drive with an inverter, has been proposed. Prior arts, in each of which coil currents are detected by the current sensor and the current detecting circuit, are disclosed in the following literatures.

CITATION LIST

Patent Literature

Patent Literature 1: Japanese Laid-open Patent Publication No. 2006-254626

Patent Literature 2: Translation of PCT Application No. 2014-503170

SUMMARY OF INVENTION

Technical Problem

A location of a rotor in a stationary state can be detected, from inductance deviation, by the above described manners. Further, the location can be determined, without performing location sensing, with rotating the rotor by forced commutation.

However, after once initiating a motor, energization for rotation is performed, so it is difficult to detect a location of the rotor from inductance deviation by applying sensing pulses. For example, inductance deviation can be detected by overlapping excitation current with high-frequency current, but large-scale hardware and software are required. Further, influences of magnetic saturation and induced voltage must be considered, and unestimatable elements, e.g., inherent errors of a motor and a driving circuit, are included.

Thus, a ramp start manner, in which a rotor is compulsorily positioned, without detecting location, by stationary excitation then revolution number of the rotor is gradually increased with synchronization, has been widely used. However, this manner has problems that it takes a long time to position the rotor and that a reverse rotation of the rotor will occur. Further, the synchronization is performed by open-loop control, so it takes a long time to increase a rotational speed, step-out will be easily occurred by load variation, the motor is initiated by passing a large current to avoid the above problems, motor efficiency must be lowered and a large DC electric source must be required. Since step-out is caused by load variation, usage of the motor is limited, so it cannot be used in, for example, reciprocating mechanisms, rotary mechanisms driven by external force, and mechanisms in which viscous load and load vary.

A spatial vector PWM manner, in which a location of a rotor is estimated by applying period fluctuation to each of PWM pulses and measuring response, and another manner, in which a location of a rotor is detected by applying periodical location sensing pulses, have been proposed. However, in these manners, there is a problem of generating audible sensing noise.

Solution to Problem

The present invention has been invented to solve the above described problems, and an object is to provide a method for detecting magnetic field location which can realize low cost by using simple hardware and software and can detect a rotor location in units of excitation sections in 120°-energization without generating sensing noise at the time of initiation.

In the method, an electric motor comprises: a rotor having a permanent magnetic field; and a stator having three-phase coils, and which is initiated by 120°-energization of a constant-voltage DC electric source, the electric motor further comprises: output means for two-way-energizing the coils through a half-bridge type inverter circuit; measurement means for A/D-converting coil voltage and sending the converted voltage to control means; and the control means for PWM-controlling coil output on the basis of a command of a superordinate controller, storing energization angle information and energization pattern information, for continuous rotation, in units of 60°-energization sections, switching-controlling the output means so as to switch an energization state on the basis of the stored information, inputting a measurement value of the measurement means, and determining an end point of the 60°-energization section, an energization section of electric angle of 30°-90° is named as a section 1, an energization section of electric angle of 90°-150° is named as a section 2, an energization section of electric angle of 150°-210° is named as a section 3, an energization section of electric angle of 210°-270° is named as a section 4, an energization section of electric angle of 270°-330° is named as a section 5, and an energization section of electric angle of 330°-30° is named as a section 6, and a positive-side threshold value and a negative-side threshold value, each of which has prescribed potential difference, within a range not exceeding peak voltage or bottom voltage of non-energization-phase voltage, with respect to a neutral point potential which is a half of inter-energization-phase voltage, are previously set in the control means, and said method comprises the steps of: performing PWM-energization, which periodically includes off-cycles, in an energization pattern in which a location of self-excitation-stopping caused by two-phase locked energization performed by the output means corresponds to a start point of the 60°-energization section, when present locations and rotational directions of the rotor have been decided; measuring energization-phase voltage and non-energization-phase voltage in on-cycles of the PWM-energization; obtaining, through calculation, a neutral point potential from the energization-phase voltage measured by the measurement means; determining the start point of the 60°-energization section when the non-energization-phase voltage intersects the neutral point; obtaining a difference between the neutral point potential and the non-energization-phase voltage; performing magnitude comparison between the difference and the negative-side threshold value in the case where the present location is an odd-numbered section or between the difference and the positive-side threshold value in the case where the present location is an even-numbered section; and determining an end point of the 60°-energization section when the difference exceeds the threshold value in a direction away from the neutral point potential.

As described above, a peak part adjacent to a setup location or the end point of the section located at a bottom part can be detected from the magnetic field location which is detected on the basis of the preset threshold values. When non-energization-phase voltage exceeds the threshold value, if the rotor is rotating in a direction of increasing a rotation angle (CW-rotation), a numeric value one is added to the section number; if the rotor is rotating in a direction of reducing the rotation angle (CCW-rotation), a numeric value one is subtracted from the section number, so that continuous rotation can be performed.

For example, in a case where the rotor is CW-rotating in the section 1 by U-V excitation, determining if the rotor passes 30° or not can be performed by changing excitation to W-U excitation at a moment and measuring voltage of non-energization-phase V. By periodically repeating the measurement until passing 30°, the start point of the section, i.e., excitation switching point, can be detected. In a case where the rotor is CCW-rotating, determining if the rotor passes 90° or not can be performed by changing excitation to W-V excitation at a moment and measuring voltage of non-energization-phase U, so that the location of 90° can be detected as well as the case of CW rotation. After and before the setup location, i.e., 30° or 90°, voltage gradient is steep, so positive/negative determination is easy, phase shift is small, so that the locations can be securely detected.

In another method, an electric motor comprises: a rotor having a permanent magnetic field; and a stator having three-phase coils, and which is initiated by 120°-energization of a constant-voltage DC electric source, the electric motor further comprises: output means for two-way-energizing the coils through a half-bridge type inverter circuit; measurement means for A/D-converting coil voltage and sending the converted voltage to control means; and the control means for PWM-controlling coil output on the basis of a command of a superordinate controller, storing energization angle information and energization pattern information, for continuous rotation, in units of 60°-energization sections, switching-controlling the output means so as to switch an energization state on the basis of the stored information, inputting a measurement value of the measurement means, and determining an end point of the 60°-energization section, an energization section of electric angle of 30°-90° is named as a section 1, an energization section of electric angle of 90°-150° is named as a section 2, an energization section of electric angle of 150°-210° is named as a section 3, an energization section of electric angle of 210°-270° is named as a section 4, an energization section of electric angle of 270°-330° is named as a section 5, and an energization section of electric angle of 330°-30° is named as a section 6, and a positive-side threshold value and a negative-side threshold value, each of which has prescribed potential difference, within a range not exceeding peak voltage or bottom voltage of non-energization-phase voltage, with respect to a neutral point potential which is a half of inter-energization-phase voltage, are previously set in the control means, an induced voltage constant of the motor is previously stored, a revolution number is obtained from a section time while rotation, a calculation result of "revolution number×induced voltage constant×sin 30" is added to the positive-side threshold value and subtracted from negative-side threshold value, and said method comprises the steps of: performing PWM-energization, which includes off-cycles, when present locations and rotational directions of the rotor have been decided; measuring energization-phase voltage and non-energization-phase voltage in on-cycles of the PWM-energization; obtaining, through calculation, a neutral point potential from the energization-phase voltage measured by the measurement means; obtaining a difference between the neutral point potential and the non-energization-phase voltage; performing magnitude comparison between the difference and the negative-side threshold value in the case where the present location is an odd-numbered section or between the difference and the positive-side threshold value in the case where the present location is an even-numbered section; and determining an end point of the 60°-energization section when the difference exceeds the threshold value in a direction away from the neutral point potential.

With this method, detection errors of the end points of sections, which are caused by revolution number of the motor, can be reduced.

Preferably, a maximum time, which is longer than a time period of one section of normal initiation, is previously set in the control means; a time between starting energization of the section and detecting the end point of the section is measured; the energization is stopped when no end point of the section is detected within the maximum time; an initial location is detected by an optional manner; and the energization and detecting the end point of the section are restarted on the basis of the initial location.

With this method, the rotor can be returned to a normal rotation state from a reverse rotation state or a stationary state.

Preferably, a standard value of energization voltage is previously set in the control means; a correction value is obtained from a ratio between inter-energization-phase voltage and the standard value; and the threshold values is corrected by multiplying the correction value.

With this method, accuracy of detecting the magnetic field location can be improved by the correction with reflecting variation of coil applying voltage to the threshold value.

In the method, a prescribed start point threshold value, which corresponds to non-energization-phase voltage of the start point of the section with respect to a neutral point potential which is a half of inter-energization-phase voltage, for each section may be previously stored in the control means; magnitude comparison between non-energization-phase voltage and the start point threshold value may be performed, every time non-energization-phase voltage of the section is measured, while rotating at an extremely low speed; a state may be determined that the rotor passes the start point of the section with rotating in a reverse rotational direction when the non-energization-phase voltage exceeds the start point threshold value; and a numeric value one may be subtracted from number of the section, in the reverse rotational direction, and excitation may be performed so as to generate normal rotation torque for restraining the reverse rotation or returning to the normal rotation.

With this method, the start point can be detected, without performing specific excitation for detecting the magnetic field location, in a driving excitation state. Therefore, energization efficiency is not lowered, and no electronic noise caused by sensing energization is generated. Further, by detecting the start point, the reverse rotation state of the rotor can be braked and returned to the normal rotation state.

Advantageous Effects of Invention

The location of the rotor can be detected, without using a location sensor, in the stationary state and the low speed rotation state, and closed-loop control can be performed, so that the motor can be rapidly initiated and no step-out occurs. Therefore, stool operation, in which torque is generated in the stationary state, can be performed, excitation can be continued even if the rotor is stopped by overload, etc., reciprocating operation including abutting-stop can be performed, and the rotor can be initiated, by an external force, while rotating in the reverse direction.

Since the motor can be initiated by the closed-loop control, slow start can be performed by restraining initiation current, and no large current is required for preventing step-out and compulsory synchronization, so that motor efficiency can be improved, and the DC electric source can be downsized.

A zero-cross comparator, a current detection amplifier, etc. are not required, so that the driving circuit can be constituted at low cost.

Since the location is detected by using driving PWM pulses, high electric power is not required, the motor efficiency can be higher, and quiet operation (except while rotating in the reverse direction) can be performed with no sensing noise.

By the above described superior properties, motors having hall sensors and motors having brushes can be replaced with the motor relating to the present invention, motors for mobile devices, e.g., electric automobile, drone, can be downsized and lightened, motor efficiency can be highly improved, and production cost of the motor can be reduced.

DESCRIPTION OF EMBODIMENTS

Embodiments of the method of the present invention for detecting magnetic field locations of a motor relating to the present invention will now be described with reference to the attached drawings. In the following descriptions, a sensorless motor, comprising: a rotor having a permanent magnetic field; and a stator having star-connected coils, which are arranged with a phase difference of 120° and in which phase ends are connected to a motor driving circuit, will be explained as an example of the motor relating to the present invention.

An example of a method for detecting permanent magnetic field location of the sensorless motor, e.g., three-phase brushless motor, will be explained with reference to a structure of a sensorless motor driving unit.

Figure 9:
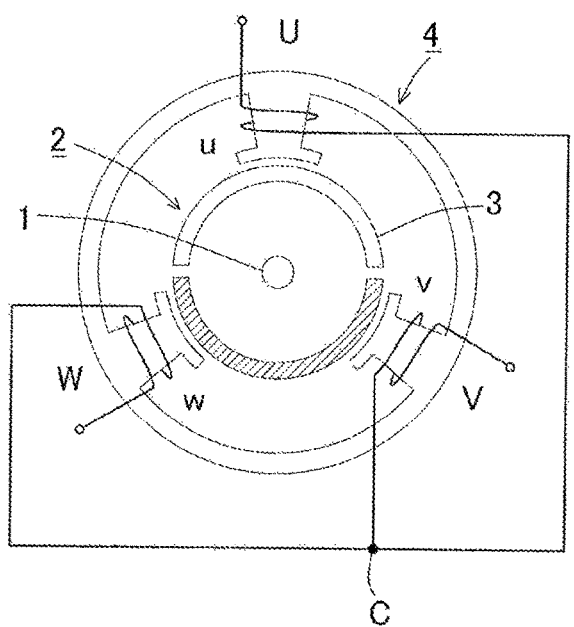
FIG. 9 is a constitution view of a three-phase brushless DC motor, in which coils are star-connected.
Figure 10:
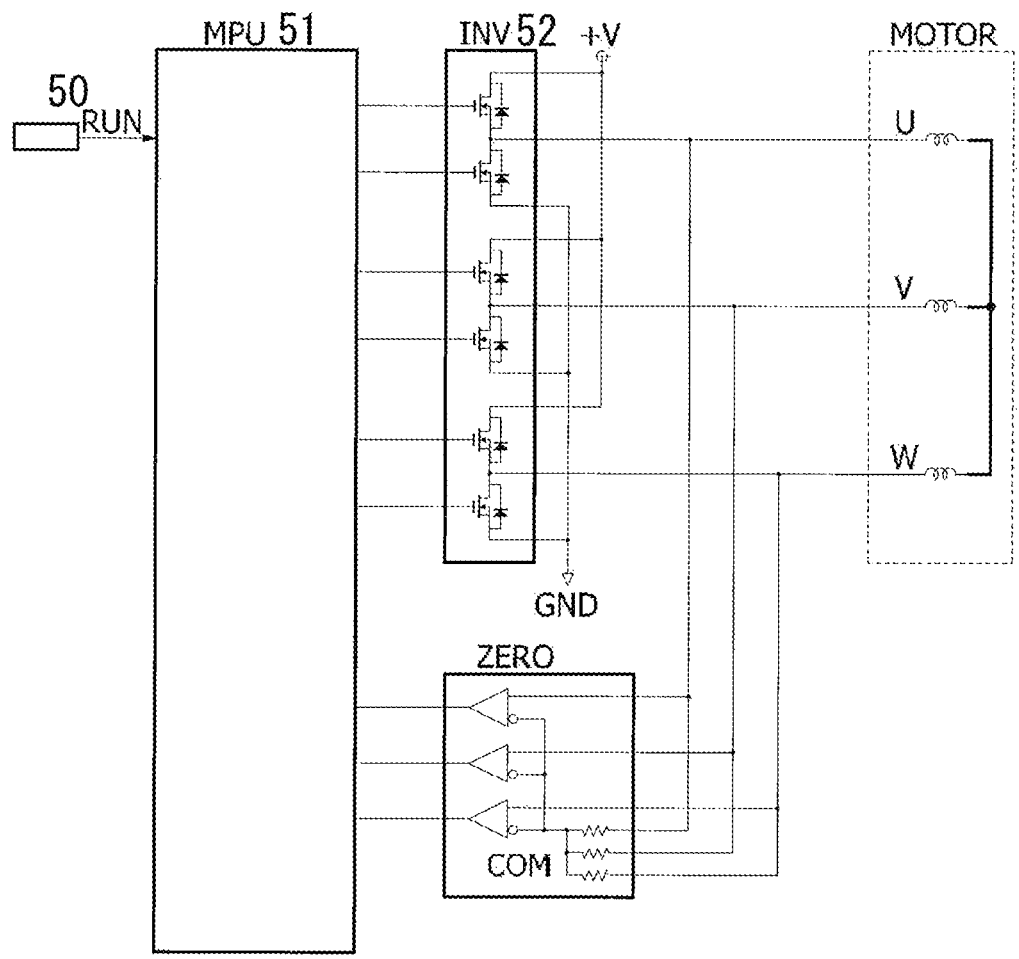
FIG. 10 is a block diagram of a conventional motor driving circuit.
Figure 11:
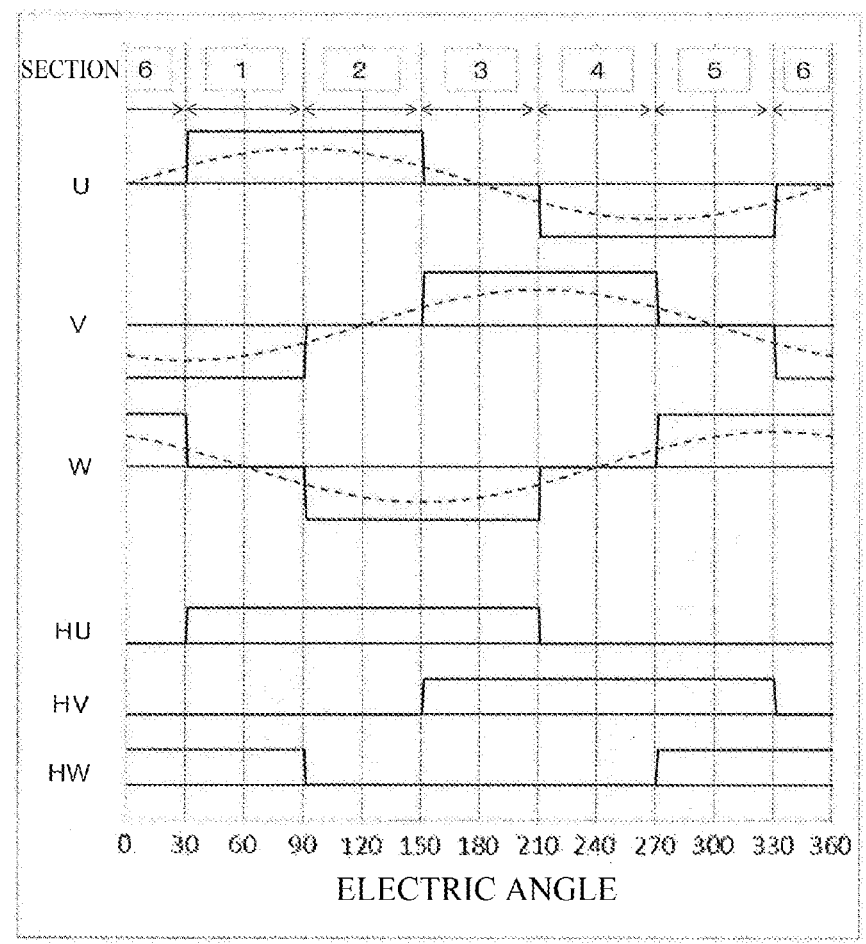
FIG. 11 is a timing chart of 120°-energization.

An example of a three-phase brushless DC motor relating to the present invention is shown in FIG. 9. For example, the three-phase brushless DC motor has a two-pole permanent magnet rotor 3 and a stator 4 having three slots. The motor may be an inner rotor type or an outer rotor type. Further, the permanent magnetic field may be an implanted permanent magnet (IPM) type or a surface permanent magnet (SPM) type.

In FIG. 9, the rotor 2 is integrated with a rotor shaft 1, and a two-pole permanent magnet 3 is provided as a magnetic field. The stator 4 facing the permanent magnet 3 has pole teeth U, V and W, which are arranged with a phase difference of 120°. Coils u, v and w are respectively formed on the pole teeth U, V and W, the phases are mutually star-connected at common C, and they are connected to the motor driving system, which will be described later, as the three-phase brushless DC motor. Note that, a common line is not required, so it is omitted in the drawing.

Figure 8:
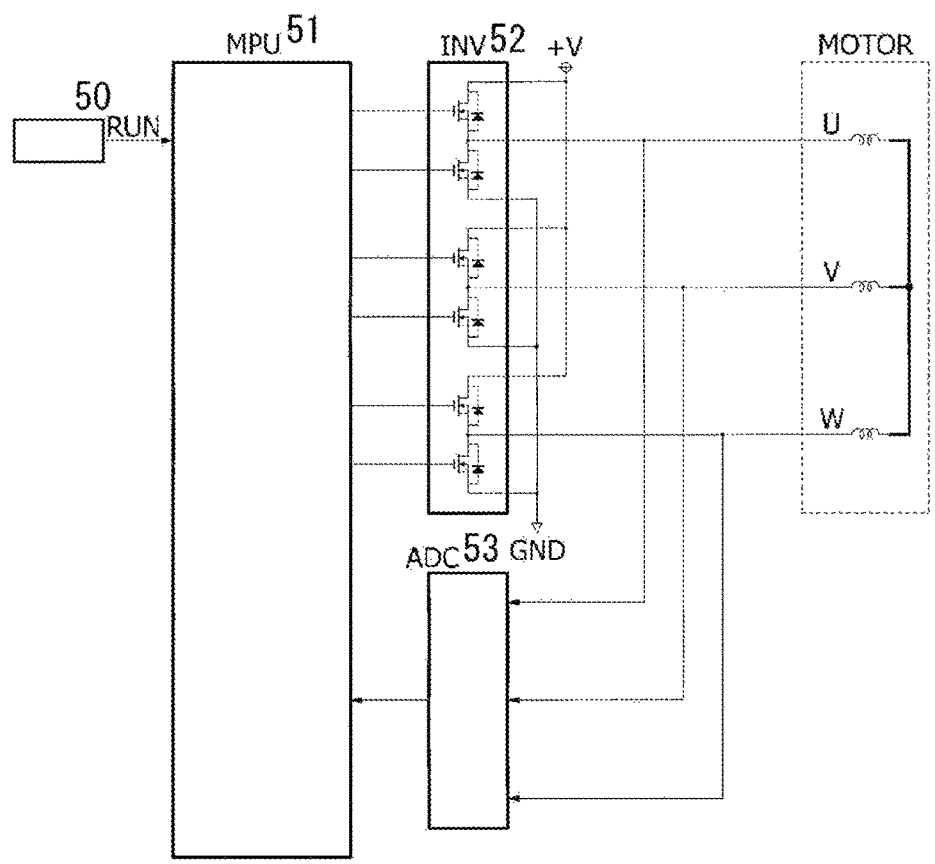
FIG. 8 is an example of a block diagram of a driving circuit of an embodiment.

Next, an example of a motor driving circuit for the three-phase DC brushless motor is shown in FIG. 8.

An initiating manner of the motor is a 120°-energization bipolar rectangular-wave excitation manner.

MOTOR is the three-phase sensorless motor. An MPU 51 is a microcontroller (control means). The MPU 51 stores six energization patterns for the three-phase coils (U, V and W) and magnetic field location information for assigning excitation switching sections (section 1 to section 6) of 120°-energization which respectively correspond to the energization patterns, and switching-controls the output means, on the basis of rotation commands sent from a superordinate controller, so as to optionally switch the excitation state.

A three-phase half-bridge type invertor circuit 52 (INV: output means) energizes the three-phase coils so as to switch the excitation phase or perform switching actions, e.g., PWM control, for controlling motor torque. The invertor circuit 52 includes diodes, which are respectively connected in reversely parallel to switching elements, and half-bridge type switching circuits for three phases, which are capable of being optionally connected to a positive pole power source line and an earth power source line.

An A/D converter circuit 53 (ADC: measurement means) is connected to coil output terminals U, V and W, simultaneously samples coil voltages of the three phases according to a conversion starting signal from the MPU 51, sequentially performs A/D-conversion and sends conversion results to the MPU 51. The ADC 53 is usually included in the MPU 51, so it is preferable to provide a voltage divider circuit constituted by resistances, in case of using a built-in ADC 53, because maximum input voltage is low. In the present embodiment, the driving circuit has a very simple structure.

(Measured Waveform)

It is known that inductance variation (space harmonic wave) caused by a rotor angle θ approximates to $\Delta L = -\cos(2\theta)$ and that inductance variation has two-periodicity per electric angle. On the other hand, the inventor of the present application found that voltage variation having two-periodicity, which is centered around neutral point potential, according to the angle θ, in a non-energization-phase by performing two-phase energization by the manner of rectangular-wave PWM energization, is observed.

Figure 1:
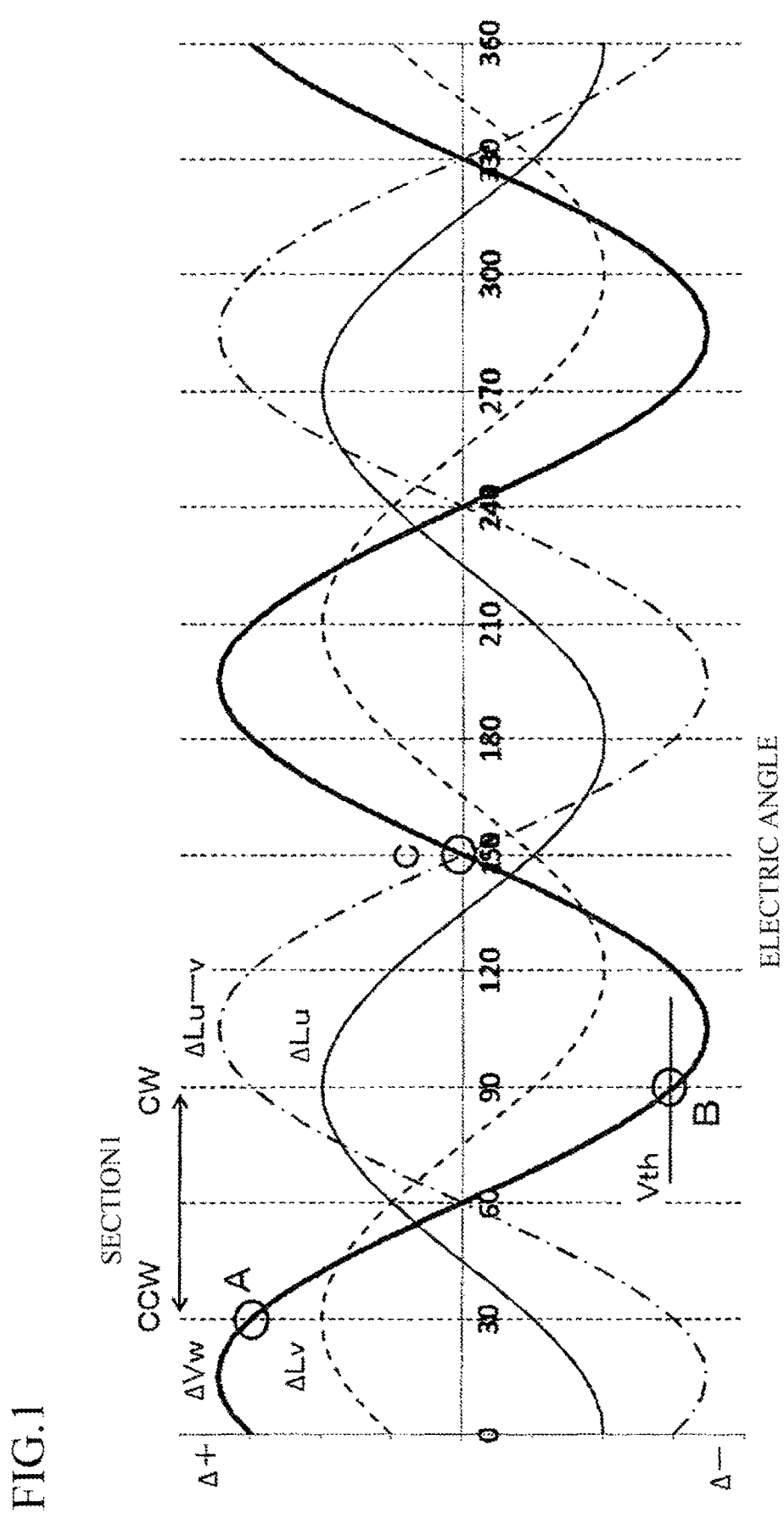
FIG. 1 is a waveform chart of a waveform of inductance and non-generation-phase voltage while performing U-V excitation.

Theoretical waveforms of a voltage variation waveform ΔVw of a non-energization-phase, inductance variations (ΔLu and ΔLv) of the U-phase and the V-phase, and combined inductance variation ΔLu-v of the two phases, which occur when the rotor is rotated one electric angle with performing U-V excitation by PWM energization, are shown in FIG. 1. Note that, the inventor assumes that the voltage variation waveform is obtained by inverting polarity of the waveform of the combined inductance variation, and it varies to a positive-side and a negative-side with respect to the neutral point potential which is a half of coil applying voltage.

Figure 7A:
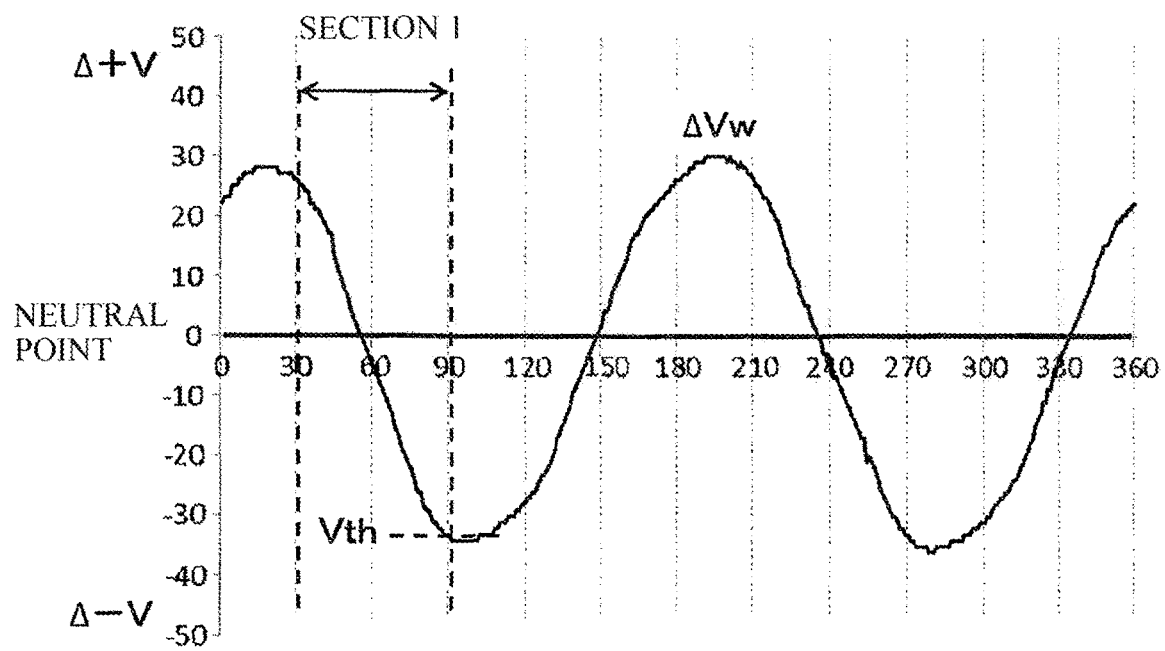
FIG. 7 includes actually measured waveforms of non-generation-phase voltage.

An actually measured waveform of a non-energization-phase voltage of an inner rotor-type motor is shown in FIG. 7A. The polarity of the theoretical voltage of the non-energization-phase is inverted by reflecting inductance, the both waveforms approximate to each other, so it was found that the assumption is correct. In case of performing the rectangular-wave energization, a ringing phenomenon occurs in induced voltage; according to measurement results, ringing time is very short, e.g., several s to several dozen s in various types of motors, so the time is within a range of error, and it was found that induced voltage can be accurately detected by rectangular-wave PWM energization pulses too for driving motor.

Next, influence of magnetic saturation will be explained. Inductance variation is stopped by passing a large current through a coil, and this phenomenon is especially significant in a small outer rotor-type motor. In an inductance variation waveform having two-periodicity, a peak and a bottom adjacent to a setup location, at which a rotor is stopped by self-excitation-stopping caused by two-phase locked energization, are remained but a peak and a bottom on the other side are disappeared when magnetic saturation occurs, so the waveform has one-periodicity.

Figure 7B:
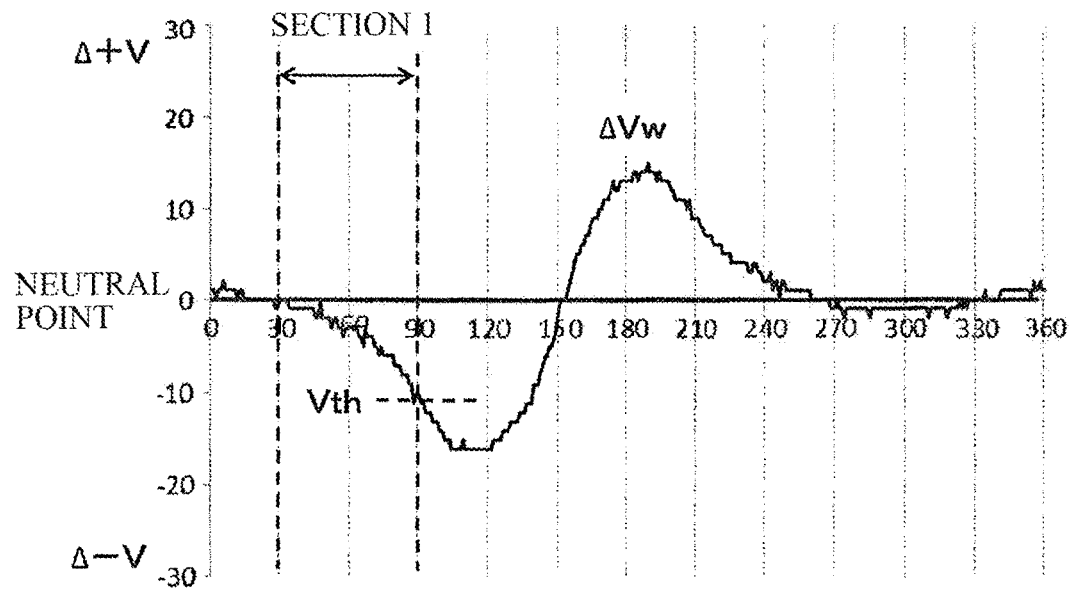

The inductance waveform whose periodicity is changed to one-periodicity by magnetic saturation is shown in FIG. 7B. The used motor is a small outer rotor-type motor, which is different from the motor of FIG. 7A. A setup location for U-V energization is 150°, the peak and the bottom adjacent to the setup location are clearly observed in a ΔVw waveform.

The setup location at which the rotor is stopped by self-excitation-stopping caused by two-phase locked energization is an inductance zero-cross point, and a setup location and the peak and the bottom adjacent thereto are stabilized with respect to magnetic saturation.

As clearly shown in FIGS. 7A and 7B, voltage variation of a non-energization-phase reflects the rotor angle θ, and monotony is kept in a section, so that even in case that no induced voltage is generated in a stationary state, a location of the rotor can be estimated by passing excitation current. Voltage variation width becomes 10% of a coil applying voltage or more, e.g., several volts, so this example is highly superior to the conventional manner in which induced voltage of millivolt-order level is detected at initiation.

As described above, in the present embodiment, inductance variation is detected by performing rectangular-wave PWM control for driving the motor, and the rotor location can be stably detected from the stationary state to a low speed rotation state by using inductance variation near the setup location only. Therefore, a sensing process can be simplified, sensing efficiency can be improved without using high electric power, and generating sensing noise can be prevented so that the quiet motor can be realized.

Angles and energization patterns of the sections of the 120°-energization are respectively shown in the following table. In the table, CW-energization means energization patterns for rotating the rotor in a direction of increasing the rotor angle, and CCW-energization means energization patterns for rotating the rotor in a direction of reducing the rotor angle. Setup Energization means energization patterns for self-excitation-stopping the rotor at an angle written in parentheses, a start point and an end point of each section are written. In each of the energization patterns, the phase connected to a plus-side of an electric source is written ahead, and the phase connected to GND-side is written latterly.

TABLE 1

Angle of Section and Energization Pattern

| Section Number | Angle of Section | CW-energization | CCW-energization | Setup Energization |
|---|---|---|---|---|
| 1 | 30°~90° | U-V | V-U | W-U (30°)<br>W-V (90°) |
| 2 | 90°~150° | U-W | W-U | W-V (90°)<br>U-V (150°) |
| 3 | 150°~210° | V-W | W-V | U-V (150°)<br>U-W (210°) |
| 4 | 210°~270° | V-U | U-V | U-W (210°)<br>V-W (270°) |
| 5 | 270°~330° | W-U | U-W | V-W (270°)<br>V-U (330°) |
| 6 | 330°~30° | W-V | V-W | V-U (330°)<br>W-U (30°) |

(Detecting End Point of Section)

A rotational direction CW written in TABLE 1 is a direction for increasing the section number, and a rotational direction CCW is a direction for reducing the section number. The end point of section is a boundary point with an adjacent plus-side section when rotating in the direction CW, and is a boundary with an adjacent minus-side section when rotating in the direction CCW. For example, in the section 1, the end point is a boundary point of 90° with the section 2 when rotating in the direction CW, and the end point is a boundary point of 30° with the section 6 when rotating in the direction CCW.

In FIG. 1, when U-V excitation is performed and the rotational direction is CW, the start point of the energization section is indicated by a symbol A, and the end point thereof is indicated by a symbol B. The setup point is C, and the phase of the bottom part including the point B is stabilized so it can be used for location detection, which have a prescribed electric potential difference with respect to neutral point potential, are previously set, and magnitude comparison between non-energization-phase voltage ΔVw and the threshold value Vth is performed for each measurement, then passing the end point of the section is detected when the non-energization-phase voltage exceeds the threshold value.

Figure 4:
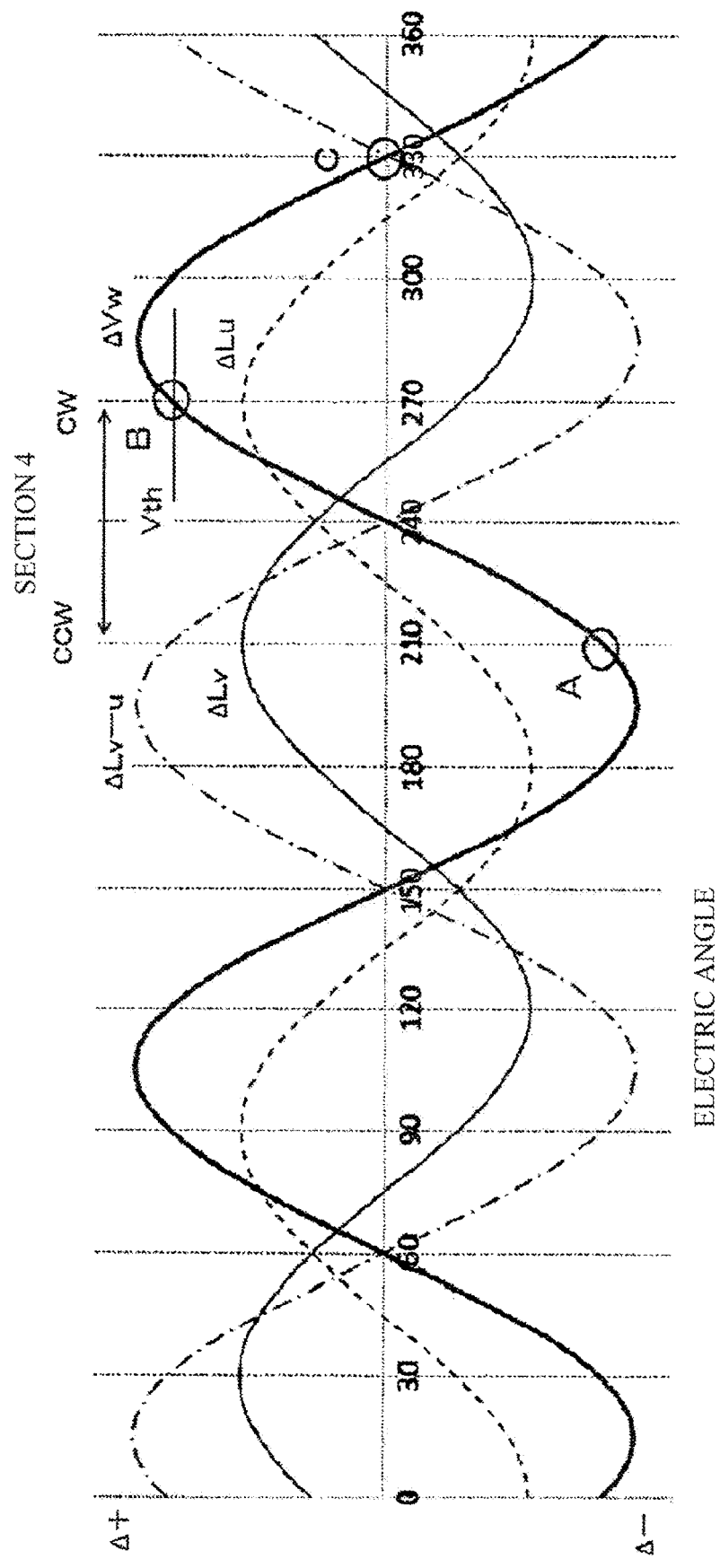
FIG. 4 is a waveform chart of a waveform of inductance and non-generation-phase voltage while performing V-U excitation.

In case of rotating in the direction CCW, V-U energization is performed as shown in FIG. 4. The rotor rotates from electric angle of 90°-side to 30°-side. Therefore, the end point of the section is the electric angle of 30°. The setup point is an electric angle of 330°, and the phase of the bottom part on an electric angle of 30°-side is stabilized, so that this manner can be used for location detection. By performing magnitude comparison between voltage of the non-energization-phase W and the threshold value Vth, the end point of the section can be detected as well as the case of rotating in the direction CW.

In the section 2 from electric angle of 90° to 150°, U-W excitation is selected.

Figure 2:
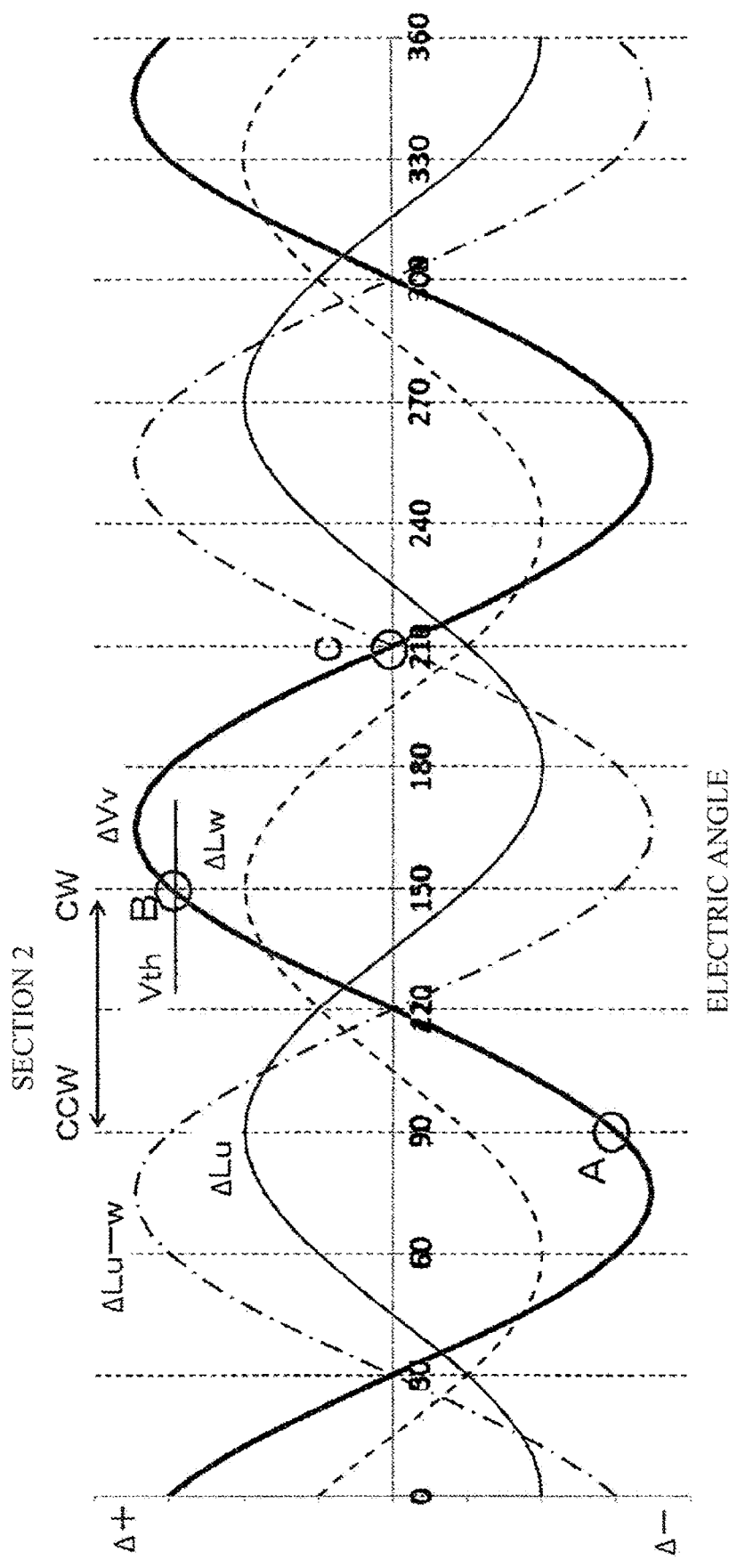
FIG. 2 is a waveform chart of a waveform of inductance and non-generation-phase voltage while performing U-W excitation.

FIG. 2 shows inductance variation and non-generation-phase voltage while performing the U-W excitation. Waveforms are shifted 60° with respect to those shown in FIG. 1, and polarity is inverted, so non-energization-phase is the V-phase and the setup location C is electric angle of 210°.

In case of existing in the section 2 and rotating in the direction CW, non-energization-phase voltage always passes the point B, and the location of the rotor at that time is electric angle of 150°, so that the excitation section is switched to the section 3, when detecting the point B, so as to continuously rotate.

In the section 3 from electric angle of 150° to 210°, V-W excitation is selected.

Figure 3:
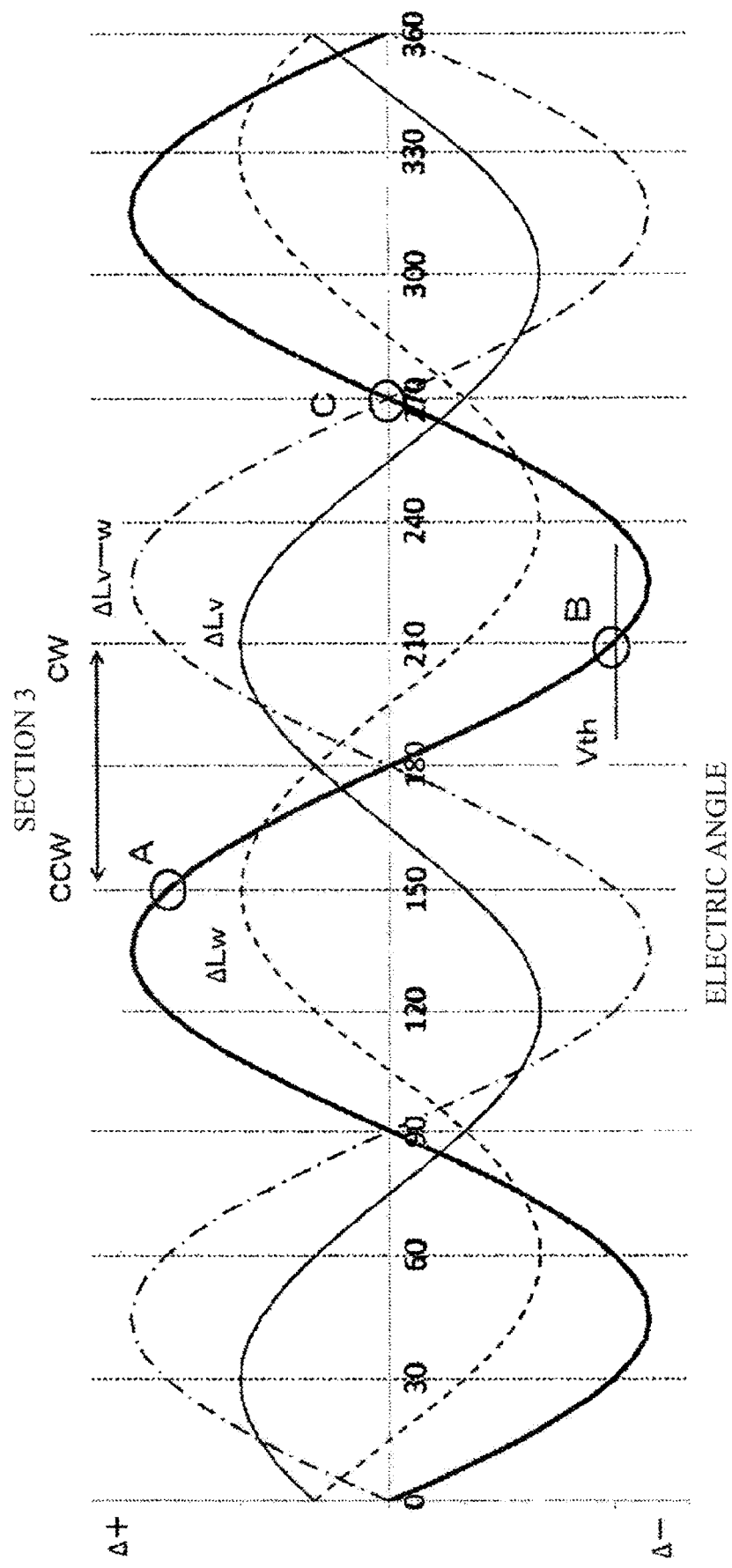
FIG. 3 is a waveform chart of a waveform of inductance and non-generation-phase voltage while performing V-W excitation.

FIG. 3 shows inductance variation and non-generation-phase voltage while performing the V-W excitation. Waveforms are shifted 60° with respect to those shown in FIG. 2, and polarity is inverted, so non-energization-phase is the U-phase and the setup location C is electric angle of 270°.

In case of existing in the section 3 and rotating in the direction CW, non-energization-phase voltage always passes the point B, and the location of the rotor at that time is electric angle of 210°, so that the excitation section is switched to the section 4, when detecting the point B, so as to continuously rotate.

In the section 4 from electric angle of 210° to 270°, V-U excitation is selected.

FIG. 4 shows inductance variation and non-generation-phase voltage while performing the V-U excitation. Waveforms are shifted 60° with respect to those shown in FIG. 3, and polarity is inverted, so non-energization-phase is the W-phase and the setup location C is electric angle of 330°.

In case of existing in the section 4 and rotating in the direction CW, non-energization-phase voltage always passes the point B, and the location of the rotor at that time is electric angle of 270°, so that the excitation section is switched to the section 5, when detecting the point B, so as to continuously rotate.

In the section 5 from electric angle of 270° to 330°, W-U excitation is selected.

Figure 5:
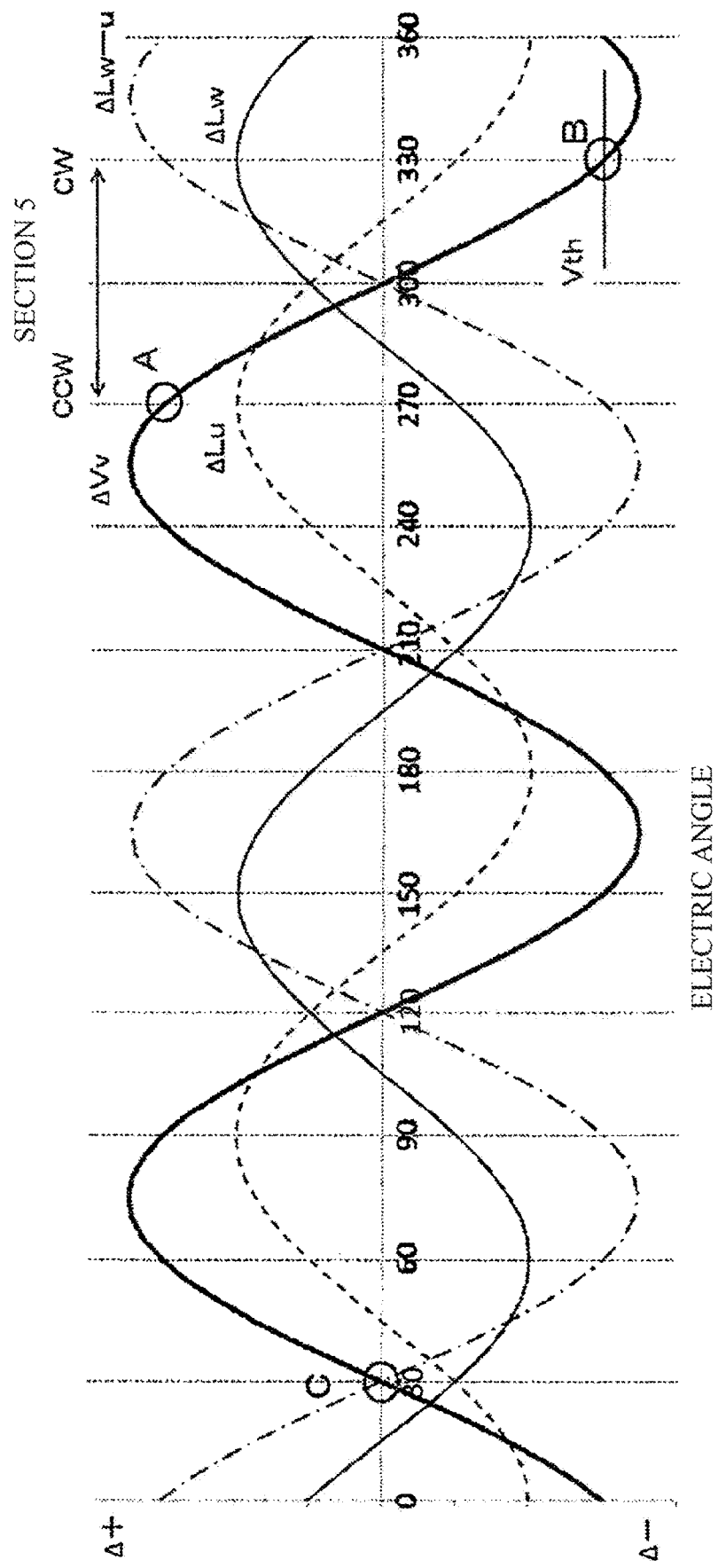
FIG. 5 is a waveform chart of a waveform of inductance and non-generation-phase voltage while performing W-U excitation.

FIG. 5 shows inductance variation and non-generation-phase voltage while performing the W-U excitation. Waveforms are shifted 60° with respect to those shown in FIG. 4, and polarity is inverted, so non-energization-phase is the V-phase and the setup location C is electric angle of 30°.

In case of existing in the section 5 and rotating in the direction CW, non-energization-phase voltage always passes the point B, and the location of the rotor at that time is electric angle of 330°, so that the excitation section is switched to the section 6, when detecting the point B, so as to continuously rotate.

In the section 6 from electric angle of 210° to 270°, W-V excitation is selected.

Figure 6:
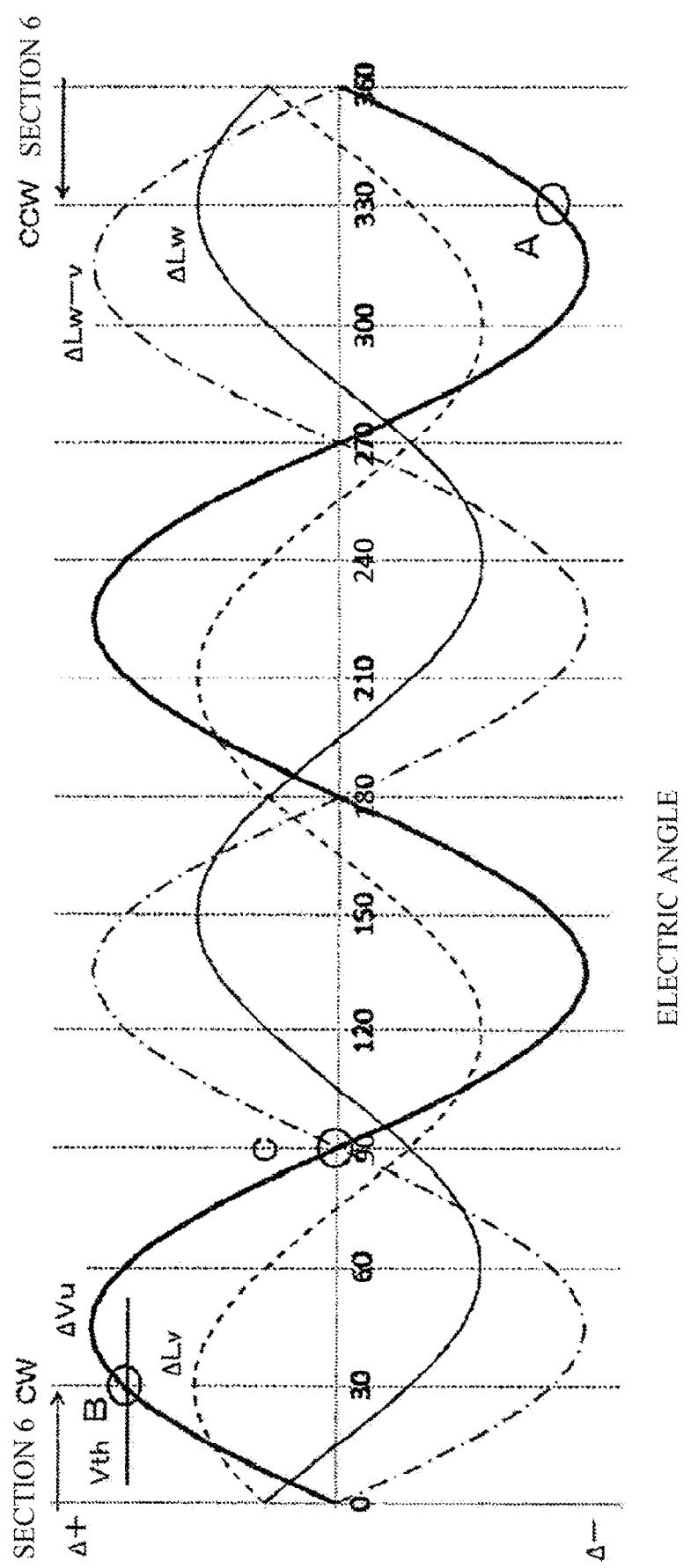
FIG. 6 is a waveform chart of a waveform of inductance and non-generation-phase voltage while performing W-V excitation.

FIG. 6 shows inductance variation and non-generation-phase voltage while performing the W-V excitation. Waveforms are shifted 60° with respect to those shown in FIG. 5, and polarity is inverted, so non-energization-phase is the U-phase and the setup location C is electric angle of 90°.

In case of existing in the section 6 and rotating in the direction CW, non-energization-phase voltage always passes the point B, and the location of the rotor at that time is electric angle of 30°, so that the excitation section is switched to the section 1, when detecting the point B, so as to continuously rotate.

As described above, the peak part adjacent to the setup location or the end point of the section located in the bottom part can be detected on the basis of the preset threshold value. When the non-energization-phase voltage exceeds the threshold value, if the rotor is rotating in the direction CW, a numeric value one is added to the section number; if the rotor is rotating in the direction CCW, a numeric value one is subtracted from the section number, so that continuous rotation can be performed.

(Detecting Start Point of Section)

The rotational direction for increasing the section number is defined as CW, and the rotational direction for reducing the section number is defined as CCW as well as the above descriptions. In case of rotating in the direction CW, the start point of the section is a boundary point with the adjacent minus (−)-side section; and in case of rotating in the direction CCW, the start point of the section is a boundary point with the adjacent plus (+)-side section. For example, in the section 1, the start point is a boundary point of 30° with the section 6 when rotating in the direction CW, and the start point is a boundary point of 90° with the section 2 when rotating in the direction CCW.

In FIG. 1, when U-V excitation is performed and the rotational direction is CW, the start point of the energization section is indicated by the symbol A. In the normal operation, the rotor is rotated in a desired rotational direction, the start point of the section need not be detected, but, in case that the rotor is rotated in a reverse direction, at a low rotational speed, by an external force, it is necessary to detect the start point so as to correctly switch excitation. When the rotor is rotated at high rotational speed, braking action is required, so it is thought that detecting the start point is required only when the rotor is rotated at low rotational speed.

In case of rotating in the reverse direction, there is a problem of induced voltage. In FIG. 1, a zero-cross point of the induced voltage of the non-energization-phase W is located at a center of the section, i.e., electric angle of 60°, and gradient of inductance variation coincides with that of induced voltage when rotating in the normal direction, so that the end point of the section can be securely detected. However, when rotating in the reverse direction, gradients of the both are opposite to each other, so the waveform of the inductance variation is cancelled, and it is difficult to detect the start point of the section. Further, in case of a motor in which periodicity is changed to one-periodicity by magnetic saturation, it is mostly impossible to detect a start point of excitation section.

Thus, by paying attention to the setup point C of the W-U excitation shown in FIG. 5, the point C passes an electric angle of 30°, so magnitude comparison between neutral point potential and voltage $\Delta Vv$ of the non-energization-phase V is performed, then if the voltage $\Delta Vv$ is smaller than the neutral point potential, it is detected that the rotor passes electric angle of 30° and rotates toward the section 6.

Therefore, in case of rotating in the section 1 with U-V excitation, determining if the rotor passes 30° or not can be performed by changing excitation to W-U excitation at a moment and measuring voltage of non-energization-phase V. By periodically repeating the measurement until passing 30°, the start point of the section, i.e., excitation switching point, can be detected.

In case of rotating in the direction CCW too, the location of electric angle of 90° can be detected by performing W-V excitation with reference to FIG. 6 and measuring voltage of non-energization-phase U, as well as the case of rotating in the direction CW.

Before and after passing the setup location, i.e., electric angle of 30° or 90°, gradient of voltage variation is steep, positive/negative determination can be easily performed, and phase shift is small, so that the location detection can be securely performed. Since a little electric power is consumed for sensing, so it is preferable to make sensing period long.

As to the sections 2-6, the start point of each section can be detected, as well, by selecting the energization pattern becoming the setup location and periodically detecting the zero-cross points of inductance. In case of detecting the start point, it is determined that the rotor is rotating in the reverse direction, so continuous rotation can be performed by backwardly progressing the section number in the reverse direction.

(Detecting Start Point at Extremely Low Speed)

In case that the rotor is rotated in the reverse direction, which is the opposite direction with respect to the desired direction, at an extremely low speed by an external force, detecting the start point of section and switching excitation are required to return to the normal rotation state, so the start point of section can be detected by setting a start point threshold value.

For example, in FIG. 1, if the present location is in the section 1, the star point threshold value may be potential of the point A. In each of the sections 2-6 shown in FIGS. 2-6 too, the start point threshold value may be potential of the point A in each section. A start point threshold value Vth2, which has a prescribed potential difference with respect to the neutral point potential, is previously set, magnitude comparison between non-energization-phase voltage $\Delta V$ and the start point threshold value Vth2 is performed for each measurement, and it is detected that the rotor location passes the start point of section when exceeding the start point threshold value. Further, gradient of the non-energization-phase voltage $\Delta V$ can be determined, so if the gradient is opposite to that of the normal rotation, it is detected that the rotor is rotating in the reverse direction.

Therefore, when the start point is detected in a state where the rotor is rotated in the reverse direction, the rotor can be rotated in the normal direction again by backwardly progressing one section form the present excitation section and performing excitation, so that torque for normal rotation can be generated and the reverse rotation is braked, then the rotor can be rotated in the normal direction.

However, polarity of induced voltage while rotating in the reverse direction is opposite to that while rotating in the normal rotation, the non-energization-phase voltage $\Delta V$ at the start point is smaller than that while rotating in the normal rotation and does not exceed the start point threshold value Vth2. In this case, the start point threshold value Vth2 may be corrected by estimating induced voltage by calculation. On the other hand, performing the detection of the start point may be limited in a state of rotating at extremely low speed where errors caused by induced voltage can be ignored.

By this method, the start point can be detected, without performing specific excitation for detecting the magnetic field location, in the driving excitation state. Therefore, energization efficiency is not lowered, and no electronic noise caused by sensing energization is generated. Further, by detecting the start point, the reverse rotation state of the rotor can be braked and returned to the normal rotation state.

(Countermeasure Against Non-Detection of End Point in Case of Omitting Detection of Start Point Due to Noise)

In case of a motor in which inductance little varies on a start point-side of an energization section, reverse rotation cannot be detected. If the rotor is rotated in the reverse direction by an external force or inertia, the reverse rotation can be detected by detecting induced voltage, but induced voltage cannot be detected when the rotor is rotated at extremely low speed because induced voltage is not generated. Namely, there is a possibility that the reverse rotation cannot be detected from inductance and induced voltage. Thus, a time axis is used.

When normally initiating a motor, the longest energization time of one section can be previously estimated on the basis of use conditions. Therefore, in case that an end point of a section is not detected for a time period sufficiently longer than the longest energization time, it is determined that a rotor is stopped by an external force or stopped by self-excitation. Further, there is a possibility that the rotor is stopped at a setup location by some kind of reason.

Thus, a maximum time, which is sufficiently longer than the longest energization time of one section in the normal state, is previously set, an energization time of the present section is measured, then if no end point of the section is detected within the maximum time, the energization is stopped, an initial location is detected by an optional manner, the energization section is set on the basis of the detected initial location, and the energization and detecting the end point of the section are restarted, so that the rotor can be returned to the normal rotation state from the reverse rotation state or the stationary state.

In an abutting-stopped state, the initial location detection is periodically performed within the maximum time, and stool operation can be performed. In case of reverse-rotating by an external force or inertia, the rotation is braked to reduce rotational speed, then determination of the section time is performed, so that the state of the rotor, i.e., reverse rotation state or stationary state, can be determined. Even if the reverse rotation is not stopped, within one section, by performing braking-energization, the rotor reversely rotates to the adjacent section and the maximum time elapses, then reinitiating is performed and braking torque is generated, so that the rotor can be rotated in the normal direction by repeating this process.

In case that the rotor is reversely rotated within electric angle of 240°-300°, at a high speed, before elapsing the maximum time, the end point of the section is detected from an opposite direction with respect to the normal detection direction, and the rotor location is corrected by progressing the section, so that braking torque is generated. In case that the rotor is reversely rotated under a condition where reverse rotation torque is mostly equal to normal rotation torque, the rotor will be stopped by self-excitation at the setup location, i.e., in a deadlock state, the rotor can be returned to the normal rotation state when elapsing the maximum time.

This method can be performed by function of a timer included in the MPU 51 without measuring signals, and programs may be simplified, and no detection signal is used, so that stable and secure operation can be performed, no sensing noise is generated, and various abnormal can be overcome. Further, by suitably selecting the maximum time, delay of detection can be short, so the rotor can be smoothly returned to the normal rotation state from the reverse rotation state or the stationary state.

(Correcting Threshold Value)

Variation of non-energization-phase voltage in the stationary state is caused by inductance, but induced voltage is overlapped thereto while rotation. Thus, it is preferable to correct the threshold value by adding induced voltage thereto. By the correction, an error of detecting the end point of section, which is caused by revolution number, can be made small. Induced voltage can be obtained by a formula of $VE = KE \times N \times \sin \theta$. Note that, KE is induced voltage constant, N is revolution number, and $\theta$ is 30°. Therefore, in case of correcting the threshold value relating to induced voltage, it is necessary to previously store KE (induced voltage constant) in the MPU 51. The revolution number can be obtained by constantly measuring the section time.

Amplitude of variation of a non-energization-phase voltage is mostly proportional to coil applying voltage. Thus, it is necessary to drive the motor by a constant voltage electric source and previously set a standard coil applying voltage. In case that coil applying voltage is largely varied, it is preferable to correct the threshold value with reflecting variation of coil applying voltage. For example, the threshold value may be multiplied by a ratio of (coil applying voltage when performing measurement)/(standard coil applying voltage).

Successively, an example of detecting magnetic field location by the MPU 51 will be explained. Firstly, the detection in the normal rotation state will be explained. The suitable threshold value Vth is previously set. An initial speed and a rotational direction are measured. The stationary state is usually detected. If the rotor is rotating, rotational operation is performed, and the present method is cancelled. If the rotor is stopped, the initial location is detected by an optional manner. As a result, the rotor locates in, for example, the section 1. Then, the U-V energization, which is the excitation pattern, is selected.

The inverter circuit 52 energizes only one pulse of the U-V energization by performing the PWM-control, and coil voltages of the three-phase coils are A/D-converted, by the ADC 53, while on-cycle. The MPU 51 obtains neutral point potential from a formula of (U-phase voltage+V-phase voltage)/2. Next, it determines if a difference between non-energization-phase voltage and neutral point potential exceeds the threshold value Vth or not. If the difference does not exceed the threshold value, the PWM-control is performed to repeat the energization and the measurement. If the difference exceeds the threshold value, the location reaches the end point of section, so the section number is progressed. Then, by repeating the selection of the excitation pattern, as well as the section 1, and the energization by performing the PWM-control, the rotor can be continuously rotated.

Next, an example of detecting magnetic field location, by the MPU 51, wherein the rotor being reversely rotated by an external force is initiated, will be explained. Firstly, the suitable threshold value Vth is previously set. An initial speed and a rotational direction are measured. The reverse rotation state is detected. If the rotor is reversely rotating at high speed, the rotation is braked by an optional manner. The initial location in a low speed rotation state is detected by an optional manner. As a result, the rotor locates in, for example, the section 1. Then, the U-V energization, which is the excitation pattern for rotating in the direction CW, is selected. Since the rotor is reversely rotating, so CW-rotation torque acts as brake torque.

The inverter circuit 52 energizes only one pulse of the U-V energization by performing the PWM-control, and coil voltages of the three-phase coils are A/D-converted, by the ADC 53, while on-cycle. The MPU 51 obtains neutral point potential from the formula of (U-phase voltage+V-phase voltage)/2. Next, it determines if a difference between non-energization-phase voltage and neutral point potential exceeds the threshold value Vth or not. The difference does not exceed the threshold value because the rotor is reversely rotating, but if the difference exceeds the threshold value, it is determined that the rotor is rotating in the normal direction, and the section number is progressed. On the other hand, if the difference does not exceed the threshold value, the PWM-control is performed to repeat the energization and the measurement. In this process, the W-U energization corresponding to the energization section 5 is performed for a short time period at a constant frequency, and the MPU determines if the non-energization-phase voltage exceeds the neutral point or not. If it exceeds the neutral point, it is determined that the location passes the start point of the section and that the rotor is reversely rotating, so the number of energization section is backwardly progressed one section, i.e., section 6. Then, by repeating the selection of the excitation pattern, as well as the section 1, and the energization by performing the PWM-control, the rotor can be continuously rotated. If normal rotation torque is greater than reverse rotation torque, the rotor will be initiated in the normal direction.

Note that, the structure of the motor circuits and the structure of the control programs may be variously varied, and they are not limited to the above described embodiments, so other principles for position detection, other circuit structures and other program structures, which are modified, by motor designers, electronic engineers and programmers (i.e., persons ordinarily skilled in the art) without deviating from the spirit of the present invention, are included in the scope of the present invention.

What is claimed is:

1. A method for detecting a magnetic field location in an electric motor, which comprises: a rotor having a permanent magnetic field; and a stator having three-phase coils, and which is initiated by 120°-energization of a constant-voltage DC electric source, the electric motor further comprising:
output means for two-way-energizing the coils through a half-bridge type inverter circuit;
measurement means for A/D-converting coil voltage and sending the converted voltage to control means; and
the control means for PWM-controlling coil output on the basis of a command of a superordinate controller, storing energization angle information and energization pattern information, for continuous rotation, in units of 60°-energization sections, switching-controlling the output means so as to switch an energization state on the basis of the stored information, inputting a measurement value of the measurement means, and determining an end point of the 60°-energization section,
wherein an energization section of electric angle of 30°-90° is named as a section 1, an energization section of electric angle of 90°-150° is named as a section 2, an energization section of electric angle of 150°-210° is named as a section 3, an energization section of electric angle of 210°-270° is named as a section 4, an energization section of electric angle of 270°-330° is named as a section 5, and an energization section of electric angle of 330°-30° is named as a section 6, and a positive-side threshold value and a negative-side threshold value, each of which has prescribed potential difference, within a range not exceeding peak voltage or bottom voltage of non-energization-phase voltage, with respect to a neutral point potential which is a half of inter-energization-phase voltage, are previously set in the control means,
said method comprising the steps of: performing PWM-energization, which periodically includes off-cycles, in an energization pattern in which a location of self-excitation-stopping caused by two-phase locked energization performed by the output means corresponds to a start point of the 60°-energization section, when present locations and rotational directions of the rotor have been decided; measuring energization-phase voltage and non-energization-phase voltage in on-cycles of the PWM-energization; obtaining, through calculation, a neutral point potential from the energization-phase voltage measured by the measurement means; determining the start point of the 60°-energization section when the non-energization-phase voltage intersects the neutral point; obtaining a difference between the neutral point potential and the non-energization-phase voltage; performing magnitude comparison between the difference and the negative-side threshold value in the case where the present location is an odd-numbered section or between the difference and the positive-side threshold value in the case where the present location is an even-numbered section; and determining an end point of the 60°-energization section when the difference exceeds the threshold value in a direction away from the neutral point potential.

2. The method for detecting a magnetic field location in an electric motor according to claim 1, wherein a maximum time, which is longer than a time period of one section of normal initiation, is previously set in the control means; a time between starting energization of the section and detecting the end point of the section is measured; the energization is stopped when no end point of the section is detected within the maximum time; an initial location is detected by an optional manner; and the energization and detecting the end point of the section are restarted on the basis of the initial location.

3. The method for detecting a magnetic field location in an electric motor according to claim 1, wherein a standard value of energization voltage is previously set in the control means; a correction value is obtained from a ratio between inter-energization-phase voltage and the standard value; and the threshold values is corrected by multiplying the correction value.

4. The method for detecting a magnetic field location in an electric motor according to claim 1, wherein a prescribed start point threshold value, which corresponds to non-energization-phase voltage of the start point of the section with respect to a neutral point potential which is a half of inter-energization-phase voltage, for each section is previously stored in the control means;
magnitude comparison between non-energization-phase voltage and the start point threshold value is performed, every time non-energization-phase voltage of the section is measured, while rotating at an extremely low speed; a state is determined that the rotor passes the start point of the section with rotating in a reverse rotational direction when the non-energization-phase voltage exceeds the start point threshold value; and a numeric value one is subtracted from number of the section, in the reverse rotational direction, and excitation is performed so as to generate normal rotation torque for restraining the reverse rotation or returning to the normal rotation.

5. A method for detecting a magnetic field location in an electric motor, which comprises: a rotor having a permanent magnetic field; and a stator having three-phase coils, and which is initiated by 120°-energization of a constant-voltage DC electric source, the electric motor further comprising:
output means for two-way-energizing the coils through a half-bridge type inverter circuit;
measurement means for A/D-converting coil voltage and sending the converted voltage to control means; and
the control means for PWM-controlling coil output on the basis of a command of a superordinate controller, storing energization angle information and energization pattern information, for continuous rotation, in units of 60°-energization sections, switching-controlling the output means so as to switch an energization state on the basis of the stored information, inputting a measurement value of the measurement means, and determining an end point of the 60°-energization section, wherein an energization section of electric angle of 30°-90° is named as a section 1, an energization section of electric angle of 90°-150° is named as a section 2, an energization section of electric angle of 150°-210° is named as a section 3, an energization section of electric angle of 210°-270° is named as a section 4, an energization section of electric angle of 270°-330° is named as a section 5, and an energization section of electric angle of 330°-30° is named as a section 6, and a positive-side threshold value and a negative-side threshold value, each of which has prescribed potential difference, within a range not exceeding peak voltage or bottom voltage of non-energization-phase voltage, with respect to a neutral point potential which is a half of inter-energization-phase voltage, are previously set in the control means, an induced voltage constant of the motor is previously stored, a revolution number is obtained from a section time while rotation, a calculation result of "revolution number×induced voltage constant×sin 30°" is added to the positive-side threshold value and subtracted from negative-side threshold value, said method comprising the steps of: performing PWM-energization, which includes off-cycles, when present locations and rotational directions of the rotor have been decided; measuring energization-phase voltage and non-energization-phase voltage in on-cycles of the PWM-energization; obtaining, through calculation, a neutral point potential from the energization-phase voltage measured by the measurement means; obtaining a difference between the neutral point potential and the non-energization-phase voltage; performing magnitude comparison between the difference and the negative-side threshold value in the case where the present location is an odd-numbered section or between the difference and the positive-side threshold value in the case where the present location is an even-numbered section; and determining an end point of the 60°-energization section when the difference exceeds the threshold value in a direction away from the neutral point potential.

6. The method for detecting a magnetic field location in an electric motor according to claim 5, wherein a maximum time, which is longer than a time period of one section of normal initiation, is previously set in the control means; a time between starting energization of the section and detecting the end point of the section is measured; the energization is stopped when no end point of the section is detected within the maximum time; an initial location is detected by an optional manner; and the energization and detecting the end point of the section are restarted on the basis of the initial location.

7. The method for detecting a magnetic field location in an electric motor according to claim 5, wherein a standard value of energization voltage is previously set in the control means; a correction value is obtained from a ratio between inter-energization-phase voltage and the standard value; and the threshold values is corrected by multiplying the correction value.

8. The method for detecting a magnetic field location in an electric motor according to claim 5, wherein a prescribed start point threshold value, which corresponds to non-energization-phase voltage of the start point of the section with respect to a neutral point potential which is a half of inter-energization-phase voltage, for each section is previously stored in the control means;

magnitude comparison between non-energization-phase voltage and the start point threshold value is performed, every time non-energization-phase voltage of the section is measured, while rotating at an extremely low speed; a state is determined that the rotor passes the start point of the section with rotating in a reverse rotational direction when the non-energization-phase voltage exceeds the start point threshold value; and a numeric value one is subtracted from number of the section, in the reverse rotational direction, and excitation is performed so as to generate normal rotation torque for restraining the reverse rotation or returning to the normal rotation.

\* \* \* \* \*